Feb. 14, 1950     H. A. McMASTER     2,497,507
ELECTRICALLY CONDUCTING MULTIPLE PANEL STRUCTURE
Filed Oct. 14, 1947
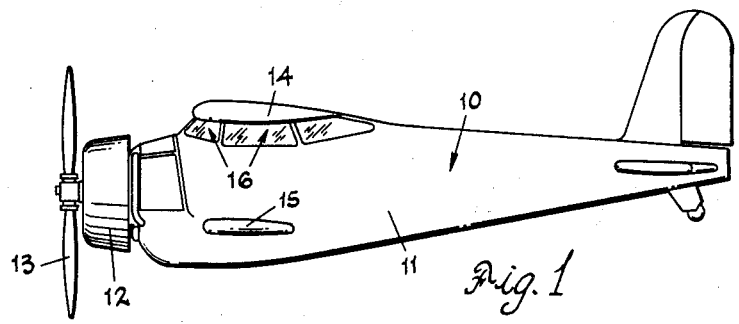
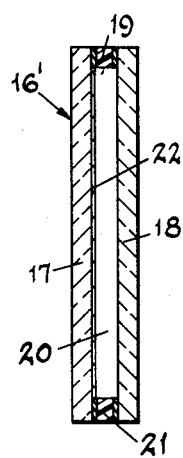
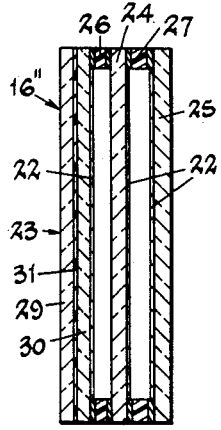
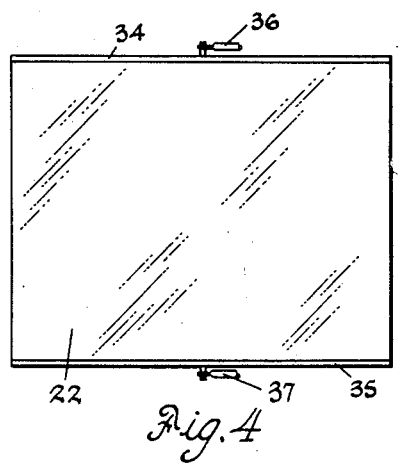
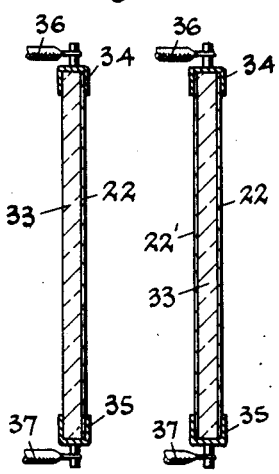
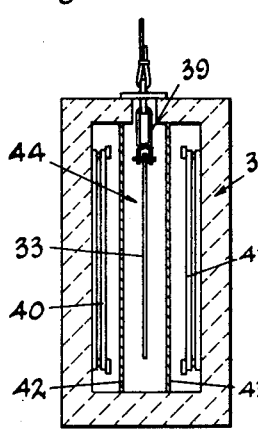
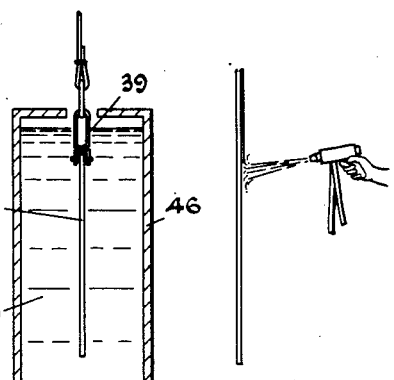
INVENTOR.
Harold A. McMaster
BY
Nobbe & Swope
ATTORNEYS Patented Feb. 14, 1950

2,497,507

UNITED STATES PATENT OFFICE 2,497,507

ELECTRICALLY CONDUCTING MULTIPLE PANEL STRUCTURE

Harold A. McMaster, Toledo, Ohio, assignor to Libbey-Owens-Ford Glass Company, Toledo, Ohio, a corporation of Ohio Application October 14, 1947, Serial No. 779,733

2 Claims. (Cl. 219—19)

The present invention relates to spaced multiple panel units, and more particularly to multiple glass sheet glazing units which include an air space between the glass sheets and in which at least one of the glass sheets is electrically conducting. This application is a continuation in part of my copending application, Serial No. 460,838, filed October 5, 1942, now Patent No. 2,429,420.

It is an object of this invention to provide a glazing unit of the above character in which one or more surfaces of at least one of the glass sheets in the unit is provided with a thin, transparent coating or film possessing the property of electrical conductivity, which coatings are clear, hard and tenacious and of uniform thickness, are in intimate contact with the glass or other surface of the panel, and which will retain these properties under adverse conditions.

A multiple glass sheet glazing unit, including an electrically conducting glass sheet of the character herein described, may be employed for a variety of purposes such as, for example, in burglar alarm systems, heating elements, windows for exteriors or interiors of buildings and so forth. A special use is the application of the multiple panel conducting units for glazing the windshields and/or window openings in airplanes and other aircraft. In fact, they may be advantageously employed for glazing all kinds of openings wherever adequate clear vision is required, particularly under adverse weather conditions. Thus, these units can be used as highly efficient de-icing windows in high altitude bombers in which icing of the windows is a major problem.

My invention is based, among other things, on my discovery that tin chlorides, including hydrated stannous chloride and hydrated stannic chloride, can be used to produce exceedingly thin transparent coatings or films on glass or other vitreous surfaces and that such coatings or films have good electrical conducting properties.

During tests with dry salts it was observed that an excellent clear conducting film formed where glass was exposed to both dry stannic chloride vapors and air.

In my work with tin chlorides, I discovered that when hydrated stannous chloride is vaporized onto the surface of hot glass it forms a thin film having good conducting properties. This was accomplished by placing a small quantity of stannous chloride salt crystals on a sheet of glass and heating the glass to redness in a Bunsen flame. When this was done, the crystals vaporized and the vapors therefrom formed a conductive film on the glass. This film, however, was somewhat foggy and varied in thickness over the sheet.

I then discovered that the fogging of the glass could be considerably reduced by producing a film with liquid stannic chloride vapors carried in a stream of carbon dioxide gas or other fluid. In this method, a sheet of glass was first heated to redness and the stannic chloride vapors then directed upon the glass in a stream of carbon dioxide gas in the form of a plurality of small jets. By way of illustration, a 6 in. x 8 in. sample was coated in this manner and 80 volts A. C. current was applied to electrodes arranged along the 8 in. edges of the sample for 2 minutes after which time the glass had reached a temperature of 260° F. in the open air.

I also found that anhydrous stannic chloride dissolves in absolute alcohol without deposition, whereas if water alone is added to the stannic chloride undesirable fuming occurs and the liquid is unstable and hard to handle as well as failing to produce a satisfactory conducting coating. However, if the alcohol is first added to the stannic chloride and the water then added to this mixture, no fuming occurs and there is provided a stable liquid which can be sprayed onto glass to form a conducting coating. For example, I dissolved one part anhydrous stannic chloride by volume in one part absolute alcohol by volume and then added one part water by volume to this solution. When this mixture was sprayed (Fig. 9) on glass heated to 550 to 650° C., a clear conducting film was formed.

Further efforts to improve the uniformity of the film led to immersing the hot glass in various liquids. I discovered that a satisfactory coating liquid could be produced by combining 1 part glacial acetic acid, 1 part absolute alcohol and 2 parts stannic chloride by volume and heating until the boiling point was between 120° C. and 130° C. Stannic chloride, when used as above described, will produce conducting films not only on glass but on a variety of vitreous substances such as glazed porcelain, unglazed porcelain, ceramic bodies, fused silica, etc.

In practicing this method, the glass was heated close to the softening point and then immersed in the above liquid. The glass was allowed to remain in the liquid for only a few seconds, whereupon it was removed and cooled in the open air. Of course, this cooling may be carried out in a suitable leer or oven if desired. If the chief constituent of the liquid is stannic chloride, which has a low specific heat and heat of vaporization, cracking of the glass will be minimized. The films produced were clear and of a uniform thickness. They were also very hard and tenacious and not harmed by washing with scouring powders which do not scratch glass or by buffing with rouge. The light transmission of a half wave-length thick film applied as described was found to be 92%, while the resistance was approximately 200 ohms between parallel electrodes spaced by a distance equal to their length.

The film of the invention was found to consist substantially of tin oxide and its conductivity was found to increase with thickness. Films of various thicknesses of the order of a half wave length of light have proved to be both clear and transparent and sufficiently conductive for the present purpose.

Since the dipping method described above was found to produce very satisfactory coatings, one way in which such method may be carried out in producing the unit of the invention has been illustrated by way of example in the accompanying drawings, wherein:

Fig. 1 is a side elevation of one type of airplane in which a multiple glass sheet glazing unit produced by the present invention may be used;

Fig. 2 is a sectional view through a double glazing unit produced in accordance with my invention;

Fig. 3 is a view similar to Fig. 2, showing a modified form of multiple glass sheet glazing unit;

Fig. 4 is a plan view of a sheet of conducting glass provided by the invention for use in a multiple panel unit;

Fig. 5 is a vertical transverse section through Fig. 4;

Fig. 6 is a vertical transverse section through a sheet of glass having conducting coatings applied to both sides thereof;

Fig. 7 is a sectional view illustrating one form of apparatus which may be used for heating the glass sheet;

Fig. 8 is a sectional view illustrating the dipping of the heated sheet in the coating liquid; and Fig. 9 is a diagrammatic view showing the conducting coating being sprayed onto a heated glass sheet.

With reference now to the drawings, there is shown in Fig. 1 an airplane 10 of the type having a fuselage 11 with a forwardly located engine 12 and propeller 13. The plane is also provided with upper and lower wings 14 and 15 and a cockpit having the transparent closures 16 which substantially completely enclose the pilot and enable him to have a wide sphere of vision. The transparent closures 16 include the windshield which is located in front of the pilot and the windows arranged along opposite sides of the plane. It will of course be appreciated that the airplane herein disclosed is simply one type of plane with which the present invention may be used and that the invention is adapted for use in aircraft of all kinds. In fact, the invention may be used in glazing any opening where adequate clear vision is required under adverse weather conditions such as, for example, in aircraft carriers and other naval vessels, airport control towers, lighthouses, etc.

Figs. 2 and 3 illustrate two forms of units embodying the invention. The unit 16' of Fig. 1 is made up of two sheets of glass 17 and 18, positioned in spaced face to face relation with one another, and maintained in this position, by means of a suitable separator strip 19 arranged around and secured to the marginal portions of the glass sheet to provide a unitary structure having an air space 20 between the glass sheets.

Units of this character have proved desirable wherever it is important to reduce heat transfer through, and to prevent condensation of moisture and formation of fog, frost or ice upon, the glass in glazed openings. Thus, they have the effect of greatly retarding the escape of heat therethrough from the inside of a building or vehicle during the winter or in cold atmospheres. This is due to the fact that the air space 20 between the glass sheets, whether filled with air or gas, or exhausted to provide a partial vacuum, is an exceedingly poor conductor of heat so that a multiple sheet glazing unit possesses much greater insulating properties than a single plate or sheet of glass.

According to this invention, the air space 20 of the unit 16 may be either hermetically sealed or the separator 19 may be provided with breather openings to permit the air within the air space to flow into and out of the unit to compensate for changes in atmospheric pressures. The separator strip 19 may be of any suitable material that is resistant to moisture and water vapor and is tightly secured to the glass sheets in any desired manner such as by heat and pressure, by the use of a suitable bonding agent or adhesive 21 or, when a metal separator is used, by soldering the separator to a metallized coating on the glass.

It is also an aim of this invention to provide glazing units of the above character having greatly increased efficiency by the provision of a clear transparent electrically conducting coating applied to a surface of one or more of the glass sheets, and which coating can be connected to a supply of electrical energy in a manner to be more clearly hereinafter described, for the purpose of heating the glass sheet. The glass in the unit may be heated in this way to almost any desired temperature depending on the use to which the unit is to be put. For example, it may be heated high enough to remove, or to prevent the formation of moisture, steam or ice on the glass surface.

In Fig. 2 an electrically conducting coating 22 is shown as applied to the inner surface of the outer sheet of glass 17. Ordinarily speaking, it is desirable to have the electrically conducting coating located on the inside of the unit in order to avoid shocks and possible short circuits, although this may not be necessary in all cases.

Fig. 3 illustrates another form of multiple sheet glazing unit that can be produced in accordance with my invention. In addition to the double glazed unit shown in Fig. 2, it will be understood that units containing three or more sheets of glass are also contemplated by the invention. Thus, in the unit 16'' of Fig. 3, there are shown three sheets of glass 23, 24 and 25 held in proper parallel spaced relationship by the separators 26 and 27. The panel 23 in this embodiment is a sheet of laminated safety glass made up of two sheets of glass 29 and 30 and an interposed layer of thermoplastic 31 all bonded together under heat and pressure to form a composite structure.

Any of the panels 17 and 18 of Fig. 2 or the panels 23, 24 and 25 of Fig. 3 can of course be laminated glass, tempered glass, or ordinary sheet or plate glass as desired, and the electrically conducting coatings 22 can be applied to either one or both surfaces of any of the glass sheets in the unit.

In Figs. 4 and 5 is shown a sheet or plate of transparent glass 33 for use in the units of Figs. 2 and 3 and which is provided upon one surface thereof with an electrical conductive coating 22 applied thereto in accordance with the present invention. Carried along the upper and lower edges of the glass sheet are metal channel members 34 and 35 constituting electrodes contacting the conducting coating 18 and having attached thereto the electric connections 36 and 37 respectively.

In Fig. 4 is illustrated a sheet or plate of glass 33 having the conducting coating 22 applied to one face thereof and a second conducting coating 22' applied to the opposite face thereof.

In applying the conducting coatings 22 and 22', the glass sheet 33 is first heated to approximately the point of softening of the glass and this may be accomplished as shown in Fig. 7, wherein the sheet is suspended within a furnace 38 by relatively small hooks or tongs 39 engaging the sheet adjacent its upper edge. The furnace 38 may be of any suitable type but is here shown as being heated by the electrical heating units 40 and 41 arranged along opposite side walls thereof. Disposed inwardly of the heating units are baffle plates 42 and 43 which define themselves therebetween a heating chamber 44 within which the sheet is arranged. After the glass sheet has been properly heated, it is withdrawn from the furnace and immediately immersed in a bath of the coating liquid 45 contained in a container 46 (Fig. 8). As explained above, the heated glass sheet is immersed in the liquid for only a few seconds whereupon it is removed and cooled. Of course, if only one face of the glass sheet is to be coated as in Fig. 5 then only that face of the heated sheet is immersed in the coating liquid. This can be accomplished either by masking the opposite face or by bringing the glass sheet into contact with the liquid while supporting the sheet in a horizontal position. The coated glass sheets shown in Figs. 5 and 6 can be embodied in a multiple glazing unit comprising two or more sheets separated to provide an insulating space or spaces therebetween as shown in Figs. 1 and 2.

As above described, the bath of liquid 45 may consist of a mixture of glacial acetic acid, absolute alcohol and stannic chloride. However, another liquid found to produce satisfactory conducting coatings consists of anhydrous stannic chloride containing an excess of chloride dissolved therein and alcohol. Alcohol alone tends to crystallize with the stannic chloride but if chlorine is present a suitable liquid can be made upon boiling the solution. By way of illustration, I prepared a satisfactory liquid consisting of one part anhydrous stannic chloride containing chlorine dissolved therein and one part alcohol. The solution was boiled.

As indicated above, when desired, these coating liquids can be applied to the heated glass sheets by spraying, as indicated in Fig. 9, instead of by dipping.

Sheets or plates of glass such as shown in Figs. 5 and 6 after being coated and supplied with suitable electrodes in the manner above indicated are then combined with other glass sheets, either coated or uncoated, as shown in Figs. 2 and 3 to form the multiple glass sheets glazing units of the invention.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claims.

I claim:

1. A window comprising a plurality of transparent panels, one of which is a sheet of laminated glass and another of which is an unlaminated sheet of glass, means arranged around and secured to the marginal portions of said panels for maintaining the same in spaced relation, a clear transparent electrically conducting coating of tin oxide on that surface of said unlaminated sheet facing said laminated glass sheet, and spaced electrodes in electrical contact with said coating.

2. A window comprising a plurality of transparent panels, one of which is an outside sheet of laminated glass and another of which is an inside unlaminated sheet of glass, means arranged around and secured to the marginal portions of said panels maintaining the same in spaced relation, a clear transparent electrically conducting coating of tin oxide on that surface of said unlaminated sheet facing said laminated glass sheet, and spaced electrodes in electrical contact with said coating.

HAROLD A. McMASTER.

REFERENCES CITED

The following references are of record in the file of this patent:

UNITED STATES PATENTS

| Number | Name | Date |
| --- | --- | --- |
| 1,757,769 | Halbig | May 6, 1930 |
| 2,189,465 | Haley et al. | Feb. 6, 1940 |
| 2,205,522 | Fix | June 25, 1940 |
| 2,429,420 | McMaster | Oct. 21, 1947 |